(12) United States Patent
Park et al.

(10) Patent No.: US 10,613,371 B2
(45) Date of Patent: Apr. 7, 2020

(54) LIQUID CRYSTAL DISPLAY DEVICE

(71) Applicant: LG DISPLAY CO., LTD., Seoul (KR)

(72) Inventors: Se-Hyun Park, Incheon (KR);
Sang-Dae Han, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 216 days.

(21) Appl. No.: 15/821,312

(22) Filed: Nov. 22, 2017

(65) Prior Publication Data

US 2018/0143488 A1     May 24, 2018

(30) Foreign Application Priority Data

Nov. 23, 2016   (KR) .................. 10-2016-0156439

(51) Int. Cl.
*G02F 1/1335* (2006.01)
*G02F 1/1333* (2006.01)
*F21V 8/00* (2006.01)

(52) U.S. Cl.
CPC ....... *G02F 1/133512* (2013.01); *G02B 6/005* (2013.01); *G02B 6/0055* (2013.01); *G02F 1/133308* (2013.01); *G02B 6/0065* (2013.01); *G02F 2001/133311* (2013.01); *G02F 2001/133317* (2013.01); *G02F 2001/133322* (2013.01)

(58) Field of Classification Search
None
See application file for complete search history.

(56) References Cited

U.S. PATENT DOCUMENTS

| | | | |
|---|---|---|---|
| 2001/0019381 A1* | 9/2001 | Ma | G02F 1/133528 349/96 |
| 2002/0191131 A1* | 12/2002 | Ota | G02F 1/133512 349/110 |
| 2005/0259194 A1 | 11/2005 | Lee et al. | |
| 2008/0284956 A1* | 11/2008 | Wang | G02F 1/1336 349/113 |
| 2009/0040430 A1* | 2/2009 | Tang | G02F 1/133608 349/65 |
| 2012/0314158 A1* | 12/2012 | Oohira | G02B 6/0081 349/62 |
| 2013/0044511 A1* | 2/2013 | Motooka | G02B 6/0013 362/606 |

(Continued)

FOREIGN PATENT DOCUMENTS

CN     101587262 A    11/2009
CN     101750768 A     6/2010
(Continued)

*Primary Examiner* — Ryan Crockett
(74) *Attorney, Agent, or Firm* — Birch, Stewart, Kolasch & Birch, LLP

(57) ABSTRACT

According to the present disclosure, a thickness of a liquid crystal display (LCD) device may be minimized by directly attaching a liquid crystal panel to a guide panel and a light guide plate made of glass through a foam pad, and thus a thin LCD device may be effectively provided. In addition, light leakage between the liquid crystal panel and the guide panel may be prevented through the foam pad including a first layer, which is a light reflecting layer, and a second layer, which is a light absorbing layer, and, at the same time, a dark portion phenomenon generated at edges of the LCD device may be effectively prevented.

9 Claims, 7 Drawing Sheets

(56) References Cited

U.S. PATENT DOCUMENTS

| | | | |
|---|---|---|---|
| 2013/0294107 A1* | 11/2013 | Ohkawa | G02F 1/133615 362/606 |
| 2017/0363803 A1* | 12/2017 | Nakamori | G02F 1/133308 |
| 2018/0149800 A1* | 5/2018 | Kim | G02B 6/0055 |
| 2018/0149922 A1* | 5/2018 | Sugiyama | G02F 1/133308 |
| 2019/0113796 A1* | 4/2019 | Jin | G02F 1/133308 |

FOREIGN PATENT DOCUMENTS

| | | |
|---|---|---|
| CN | 102200658 A | 9/2011 |
| CN | 102768405 A | 11/2012 |
| CN | 104006329 A | 8/2014 |
| KR | 10-2014-0115044 A | 9/2014 |
| KR | 10-2014-0115924 A | 10/2014 |
| KR | 10-2015-0114047 A | 10/2015 |

\* cited by examiner

LIQUID CRYSTAL DISPLAY DEVICE

CROSS-REFERENCE TO RELATED APPLICATIONS

This application claims the priority benefit under 35 U.S.C. § 119(a) of Korean Patent Application No. 10-2016-0156439, filed on Nov. 23, 2016, in the Korean Intellectual Property Office, which is incorporated herein by reference in its entirety.

BACKGROUND

1. Technical Field

The present disclosure relates to a liquid crystal display (LCD) device, and more particularly, to an LCD device which realizes a light weight and a thin shape and effectively improves light leakage and a dark portion phenomenon.

2. Discussion of the Related Art

LCD devices, which are advantageous as moving picture displays and have a large contrast ratio and are actively used in TVs, monitors, and the like, realize an image realization principle based on optical anisotropy and polarization of a liquid crystal.

Such an LCD device has a liquid crystal panel, in which a liquid crystal layer is interposed between two parallel substrates that are bonded to each other, as an essential component, and an arrangement direction of liquid crystal molecules is changed by an electric field in the liquid crystal panel to realize a difference in transmittance.

However, since the liquid crystal panel does not have a self-emitting element, a separate light source is required to display the difference in transmittance as an image. To this end, a backlight unit having a light source is disposed on a back surface of the liquid crystal panel.

Here, a cold cathode fluorescent lamp (CCFL), an external electrode fluorescent lamp, a light emitting diode (LED), and the like are used as a light source of the backlight unit.

Specifically, among them, LEDs have characteristics such as a small size, low power consumption, high reliability, and the like and have been widely used as display light sources.

FIG. 1 is a cross-sectional view of a liquid crystal display device 1 according to the related art.

As illustrated in FIG. 1, the liquid crystal display device 1 includes a liquid crystal panel 10, a backlight unit 20, a guide panel 30, a cover bottom 50, and a case top 40.

Here, the liquid crystal panel 10 includes a first substrate 12 and a second substrate 14, which face each other and are bonded with a liquid crystal layer interposed therebetween, as key portions of image display.

Further, polarizers 19a and 19b for controlling a polarization direction of light are respectively attached to a front surface and a back surface of the liquid crystal panel 10.

Meanwhile, the backlight unit 20 is provided behind the liquid crystal panel 10.

The backlight unit 20 includes an LED assembly 29 disposed in a longitudinal direction of an edge of at least one side of the guide panel 30, a white or silver reflector 25 mounted on the cover bottom 50, a light guide plate 23 mounted on the reflector 25, and a plurality of optical sheets 27 disposed above the light guide plate 23.

In this case, the LED assembly 29 includes a plurality of LEDs 29a which are provided at one side of the light guide plate 23 and emit white light, and an LED printed circuit board (hereinafter, referred to as a PCB) 29b on which the LEDs 29a are mounted. Further, the PCB 29b includes an LED housing (not illustrated), which extends along a bottom thereof in the form in which the LED housing is attached to a back surface of the PCB 29b with an insulating layer interposed therebetween and is made of a metal material to discharge heat emitted from the LEDs 29a to the outside.

The liquid crystal panel 10 and the backlight unit 20 are respectively coupled to the case top 40, which surrounds an edge of an upper surface of the liquid crystal panel 10, and the cover bottom 50, which covers a back surface of the backlight unit 20, at front and rear sides while being surrounded by a rectangle-frame-shaped guide panel 30 including a vertical portion 30b and a horizontal portion 30a, and are integrated through the guide panel 30.

Meanwhile, the LED assembly 29 should be fixed by a method such as adhesion or the like so that beams of light emitted from the plurality of LEDs 29a face a light-incident surface of the light guide plate 23.

Accordingly, in the light guide plate 23, the beams of light incident from the LEDs 29a continuously travel while being totally reflected so that the beams of light may be uniformly diffused inside the light guide plate 23 and may provide a surface light source to the liquid crystal panel 10.

Here, the light guide plate 23 is made of an acrylic material. For example, the light guide plate 23 is made of a material such as poly methyl methacrylate (PMMA) or the like.

Meanwhile, recently, LCD devices have been increasingly used in applications such as portable computer monitors, desktop computer monitors, wall-mounted televisions, and the like, and have been actively studied for achieving a light weight and thinness while having a wide display area.

However, since the light guide plate 23 made of an acrylic material is expanded or deformed by heat, the light guide plate 23 and the liquid crystal panel 10 may not be directly bonded using a foam pad 16, the liquid crystal panel 10 is fixed by disposing the foam pad 16 on the horizontal portion 30a of the guide panel 30, and thus there is a limitation in thinning the LCD device 1.

SUMMARY

Embodiments relate to a liquid crystal display (LCD) device having a thickness minimized by forming a light guide plate of glass and directly fixing a liquid crystal panel to the light guide plate, and which prevents light leakage and a dark portion phenomenon.

According to an aspect of the present disclosure, there is provided an LCD device including a liquid crystal panel, a light guide plate made of glass, disposed under the liquid crystal panel, and including a first side surface, a second side surface, a third side surface, and a fourth side surface, a light source disposed on the first side surface of the light guide plate, an optical sheet disposed between the liquid crystal panel and the light guide plate, and a foam pad corresponding to upper edges of the second to fourth side surfaces of the light guide plate and disposed between the liquid crystal panel and the light guide plate, wherein the foam pad disposed on the third side surface opposite the first side surface includes a first layer, which is a light reflecting layer and is in contact with the light guide plate, and a second layer, which is a light absorbing layer and is disposed between the first layer and the liquid crystal panel.

Further, the foam pad disposed on each of the second side surface and the fourth side surface, which face each other, of the light guide plate may include a third layer, which is a light reflecting layer and is in contact with the light guide plate, and a fourth layer, which is a light absorbing layer and is disposed between the third layer and the liquid crystal panel.

Here, each of the first layer and the third layer may be made of a white or silver material, and each of the second layer and the fourth layer may be made of a black material.

Further, the LCD device may further include a guide panel configured to surround the second to fourth side surfaces of the light guide plate, and a cover bottom disposed under the light guide plate and including a horizontal surface and a vertical surface, wherein the guide panel may include a horizontal portion and a vertical portion, the horizontal portion may face the second to fourth side surfaces of the light guide plate, and the vertical portion may face the vertical surface of the cover bottom.

Further, the first layer of the foam pad may be attached to the upper edge of the light guide plate and an upper surface of the horizontal portion of the guide panel, and the second layer of the foam pad may be attached to the liquid crystal panel.

Here, the foam pad and the guide panel may have a shape which is open toward the first side surface of the light guide plate.

Further, the LCD device may further include a first reflector disposed between the cover bottom and the light guide plate.

Further, the LCD device may further include a second reflector disposed on the horizontal portion of the guide panel to correspond to the third side surface of the light guide plate.

Here, the cover bottom may be made of glass, and the LCD device may further include a light shielding tape disposed between a lower surface of the horizontal portion and the cover bottom.

Advantages and features of the disclosure will be set forth in part in the description, which follows and in part will become apparent to those having ordinary skill in the art upon examination of the following or may be learned from practice of the disclosure. Other advantages and features of the embodiments herein may be realized and attained by the structure particularly pointed out in the written description and claims hereof as well as the appended drawings.

It is to be understood that both the foregoing general description and the following detailed description are explanatory, and are intended to provide further explanation of the embodiments as claimed.

BRIEF DESCRIPTION OF THE DRAWINGS

The accompanying drawings, which are included to provide a further understanding of the disclosure, are incorporated in and constitute a part of this specification, illustrate implementations of the disclosure, and together with the description serve to explain the principles of embodiments of the disclosure.

DETAILED DESCRIPTION

Hereinafter, embodiments of the present disclosure will be described with reference to the accompanying drawings. All the components of a liquid crystal display device according to all embodiments of the present disclosure are operatively coupled and configured.

First Embodiment

Figure 2:
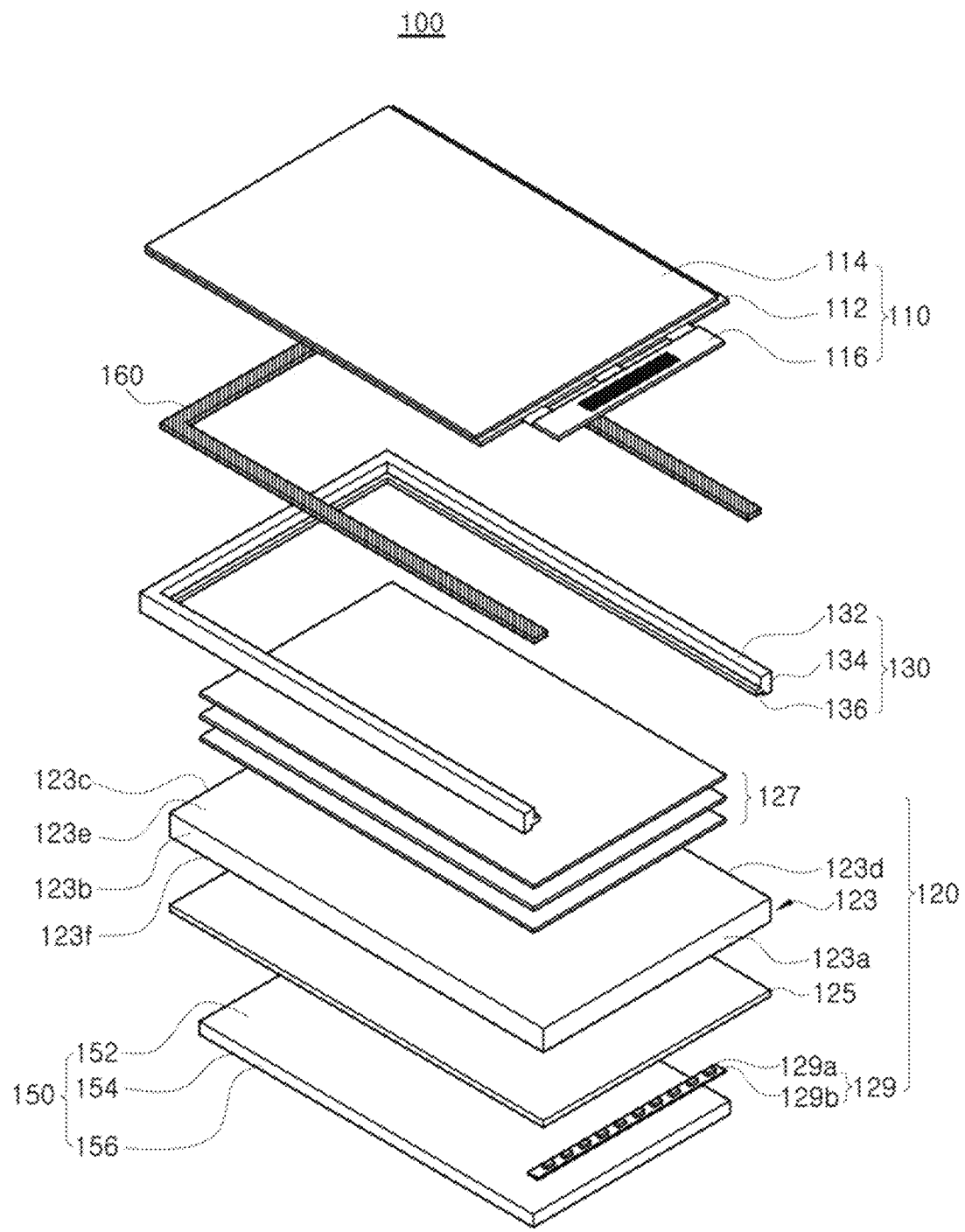
FIG. 2 is an exploded perspective view schematically illustrating an LCD device according to a first embodiment of the present disclosure.
Figure 3:
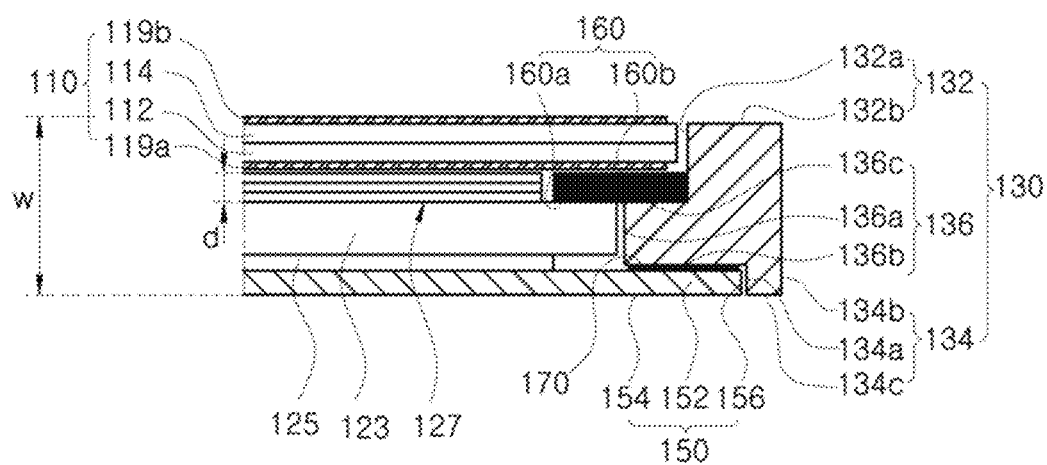
FIG. 3 is a cross-sectional view schematically illustrating a light-incident portion of the LCD device according to the first embodiment of the present disclosure.

FIG. 2 is an exploded perspective view schematically illustrating a liquid crystal display (LCD) device according to a first embodiment of the present disclosure, and FIG. 3 is a cross-sectional view schematically illustrating a light-incident portion of the LCD device according to the first embodiment of the present disclosure.

Referring to FIGS. 2 and 3, an LCD device 100 according to the first embodiment of the present disclosure may include a liquid crystal panel 110, a backlight unit 120, a guide panel 130 which is a device for supporting and coupling the liquid crystal panel 110 and the backlight unit 120, a cover bottom 150, and a foam pad 160.

Here, the backlight unit 120 of the LCD device 100 according to the first embodiment of the present disclosure is formed with an edge type backlight unit 120.

For convenience of description, a direction of a display surface of the liquid crystal panel 110 is referred to as a forward direction or an upper direction (or an upward direction), and a direction opposite thereto is referred to as a rearward direction or a lower direction (or a downward direction).

The liquid crystal panel 110 is a component which displays an image, and includes first and second substrates 112 and 114 which face each other and are bonded, and a liquid crystal layer interposed between the two substrates 112 and 114.

Further pixels may be defined on an inner surface of the first substrate 112, which is referred to as a lower substrate or an array substrate, by a plurality of gate wirings and data wirings being crossed, and a thin film transistor connected to the corresponding gate wiring and data wiring and a pixel electrode connected to the thin film transistor may be formed on each of the pixels.

Further, a color filter pattern corresponding to each of the pixels, and a black matrix which surrounds the color filter pattern and covers non-display components such as the gate wiring, the data wiring, the thin film transistor, and the like may be formed on an inner surface of the second substrate 114, which is referred to as an upper substrate or a color filter substrate, as a facing substrate which faces the lower substrate.

In this case, all types of liquid crystal panels may be used as the liquid crystal panel 110. For example, all types of liquid crystal panels such as an in-plane switching (IPS) type liquid crystal panel, a fringe field switching (FFS) type liquid crystal panel, a twisted nematic (TN) type liquid crystal panel, a vertical alignment (VA) type liquid crystal panel, an electrically controlled birefringence (ECB) type liquid crystal panel, and the like can be used. When an IPS type or FFS type liquid crystal panel is used, a common electrode which forms a transverse electric field together with a pixel electrode may be formed on the first substrate 112.

Further, an alignment layer, which determines an initial molecular alignment direction of a liquid crystal, may be formed at interfaces between the first and second substrates 112 and 114 and the liquid crystal layer, and a seal pattern may be formed along edges of the two substrates 112 and 114 to prevent leakage of a liquid crystal layer with which a gap between the first and second substrates 112 and 114 is filled.

Further, polarizers 119a and 119b through which specific polarized light is selectively transmitted may be respectively attached to outer surfaces of the first and second substrates 112 and 114.

Further, a PCB 116 may be connected along at least one edge of the liquid crystal panel 110 through a connecting member such as a flexible circuit board or a tape carrier package and may be configured to be bent back toward a back surface of the cover bottom 150 and brought into close contact therewith in a modularization process.

The backlight unit 120 is disposed in a rearward direction of the liquid crystal panel 110 configured as described above.

The backlight unit 120 may include a light-emitting diode (LED) assembly 129, a white or silver reflector 125, a light guide plate 123 mounted on the reflector 125, and optical sheets 127 disposed above the light guide plate 123.

The LED assembly 129 may include a plurality of LEDs 129a, which function as light sources of the backlight unit 120 and face a first side surface 123a which is a light-incident surface of the light guide plate 123, and a PCB 129b on which the plurality of LEDs 129a are spaced a predetermined interval from each other and mounted.

Here, the LEDs 129a are disposed to face the first side surface 123a of the light guide plate 123.

The light guide plate 123 on which beams of light emitted from the plurality of LEDs 129a are incident may allow the beams of light incident from the LEDs 129a to be uniformly spread in a wide area of the light guide plate 123 while traveling in the light guide plate 123 by being totally reflected several times so that uniform surface light is provided to the liquid crystal panel 110.

The reflector 125 is located behind the light guide plate 123 and acts to reflect light passing through a back surface of the light guide plate 123 toward the liquid crystal panel 110 and improves luminance of the light.

The optical sheets 127 may be disposed on the light guide plate 123. For example, the optical sheets 127 may include a diffusion sheet and a light collecting sheet and may act to cause a more uniform surface light processed into high quality light to be incident on the liquid crystal panel 110 by diffusing and collecting light emitted from the light guide plate 123.

Specifically, the light guide plate 123 of the LCD device 100 according to the first embodiment of the present disclosure may be formed of glass. For example, the light guide plate 123 may be made of soda lime glass, borosilicate glass, quartz glass, or the like, but the present disclosure is not limited thereto.

Figure 1:
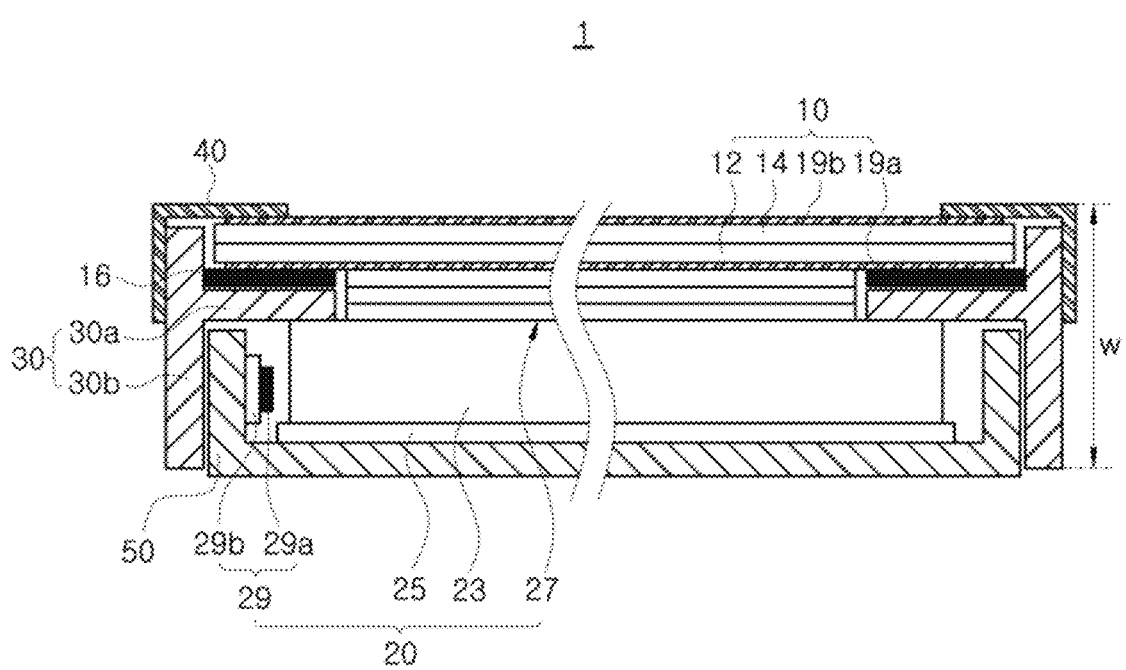
FIG. 1 is a cross-sectional view of a liquid crystal display (LCD) device according to the related art.

Accordingly, the light guide plate 123 of the present disclosure, which is made of glass having a higher rigidity than a conventional light guide plate 23 (in FIG. 1) of an acrylic material, may be less deformed by external humidity and temperature changes, and may be manufactured to be thin.

Further, the light guide plate 123 may include a back surface 123f which faces the reflector 125, an upper surface 123e which faces the plurality of optical sheets 127, and a first side surface 123a, a second side surface 123b, a third side surface 123c, and a fourth side surface 123d which connect the upper surface 123e to the back surface 123f.

Here, the first side surface 123a and the third side surface 123c may be disposed in parallel, and the second side surface 123b and the fourth side surface 123d may be disposed on in parallel.

As described above, the LEDs 129a which are light sources may be disposed on the first side surface 123a of the light guide plate 123.

Further, the cover bottom 150 of the LCD device 100 according to the first embodiment of the present disclosure may be made in a plate shape.

That is, the cover bottom 150 may have a shape of a plate on which the reflector 125 is mounted.

Here, the cover bottom 150 may include a first horizontal surface 152 having a shape of a plate on which the reflector 125 is mounted, a second horizontal surface 154 opposite the first horizontal surface 152, and a vertical surface 156 which connects the first horizontal surface 152 to the second horizontal surface 154.

Specifically, the cover bottom 150 may be made of glass. For example, the cover bottom 150 may be made of soda lime glass, borosilicate glass, quartz glass, or the like, but the present disclosure is not limited thereto.

Accordingly, the cover bottom 150 may be less deformed by external humidity and temperature changes and may be manufactured to be thin.

Meanwhile, the guide panel 130 of the LCD device 100 according to the first embodiment of the present disclosure may include a main body portion 132, a horizontal portion 136, and a vertical portion 134.

Here, the main body portion 132 may include an inner side surface 132a, which is located above the horizontal portion 136 and the vertical portion 134 and faces the liquid crystal panel 110, and a plane 132b perpendicular to the inner side surface 132a.

Further, the horizontal portion 136 may include a first surface 136a which faces the second to fourth side surfaces 123b to 123d of the light guide plate 123, a second surface 136b which faces the horizontal surface 152 of the cover bottom 150, and a third surface 136c opposite the second surface 136b. Here, the third surface 136c may be perpendicularly connected to the inner side surface 132a of the main body portion 132.

Further, the vertical portion 134 may include a fourth surface 134a which faces the vertical surface 156 of the cover bottom 150, a fifth surface 134b opposite the fourth surface 134a, and a sixth surface 134c which connects the fourth surface 134a to the fifth surface 134b. Here, the fifth surface 134b may be perpendicularly connected to the plane 132b of the main body portion 132.

Specifically, the horizontal portion 136 of the guide panel 130 may not be located above the light guide plate 123, and may be disposed on the same line as the light guide plate 123, which faces the second to fourth side surfaces 123b to 123d of the light guide plate 123.

Accordingly, an interval d between the liquid crystal panel 110 and the light guide plate 123 may be minimized.

Further, the guide panel 130 may be formed to surround the second to fourth side surfaces 123b to 123d of the light guide plate 123.

That is, the guide panel 130 may be formed in a U-shape which is open toward the first side surface 123a of the light guide plate 123 on which a light source is disposed.

Meanwhile, the cover bottom 150 may be disposed inside the fourth surface 134a of the vertical portion 134 of the guide panel 130.

That is, since the cover bottom 150 is disposed inside the fourth surface 134a of the guide panel 130, the thin LCD device 100 may be effectively implemented.

Further, a light shielding tape 170 may be disposed between the second surface 136b of the guide panel 130 and the first horizontal surface 152 of the cover bottom 150 corresponding to the second surface 136b. That is, the guide panel 130 and the cover bottom 150 may be fixed through the light shielding tape 170 having an adhesive force on both sides and, at the same time, light leakage between the guide panel 130 and the cover bottom 150 may be prevented.

Meanwhile, in the LCD device 100 according to the first embodiment of the present disclosure, the foam pad 160 may be disposed between the liquid crystal panel 110 and the light guide plate 123.

That is, the foam pad 160 may be disposed to correspond to an edge of the upper surface 123e of each of the second to fourth side surfaces 123b to 123d of the light guide plate 123, and the liquid crystal panel 110 may be mounted thereabove.

Here, the foam pad 160 may include a first adhesive surface 160a in contact with the light guide plate 123, and a second adhesive surface 160b in contact with the liquid crystal panel 110.

Therefore, the first adhesive surface 160a may come into contact with the edges of the upper surface 123e of the light guide plate 123 and the third surface 136c of the guide panel 130, and the second adhesive surface 160b may come into contact with the liquid crystal panel 110.

Here, the foam pad 160 may be formed in a U-shape, which is open toward the first side surface 123a of the light guide plate 123 on which a light source is disposed, to correspond to the guide panel 130.

Meanwhile, the LCD device 100 according to the first embodiment of the present disclosure may be configured not to include the case top 40 (in FIG. 1) which surrounds a front edge of the liquid crystal panel 110. As described above, when the LCD device 100 is configured not to include the case top 40 (in FIG. 1) and to be directly exposed to the outside, the LCD device 100 has an advantage in that it may have a beautiful appearance and may be recognized by a user as having a larger area.

Further, a thickness W of the LCD device 100 may be minimized by directly attaching the liquid crystal panel 110 to the guide panel 130 and the light guide plate 123 through the foam pad 160.

The cover bottom 150, which is made of glass, covers a lower portion of the backlight unit 120.

The liquid crystal panel 110 and the backlight unit 120 may be modularized using the guide panel 130 and the cover bottom 150 which are configured as described above.

Figure 4A:
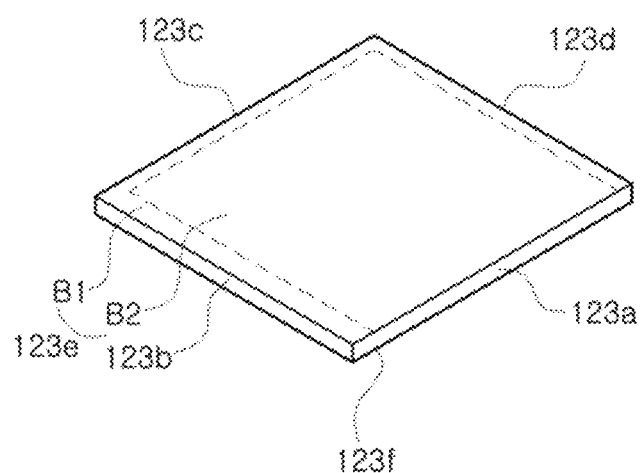
FIG. 4A is a perspective view schematically illustrating a light guide plate of the LCD device according to the first embodiment of the present disclosure.
Figure 4B:
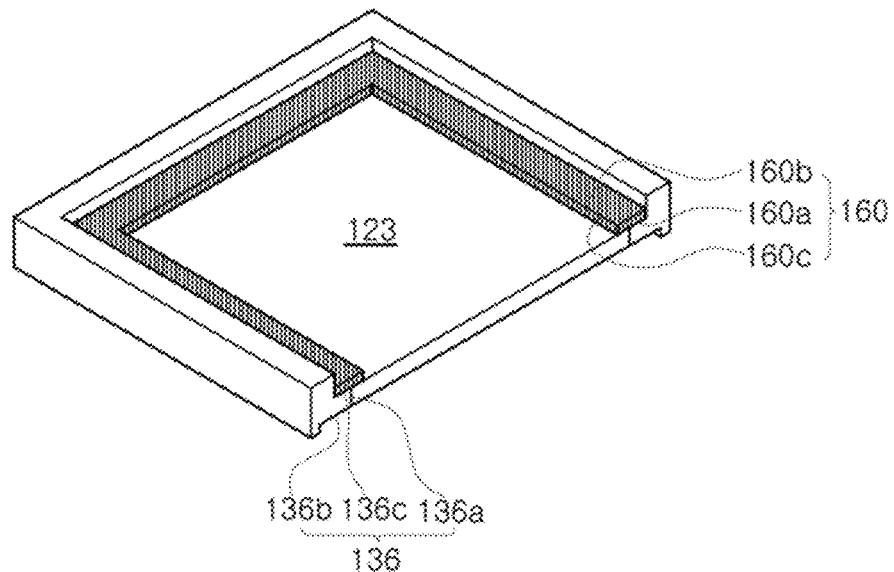
FIG. 4B is a perspective view schematically illustrating an arrangement of a foam pad of the LCD device according to the first embodiment of the present disclosure.

FIG. 4A is a perspective view schematically illustrating the light guide plate of the LCD device according to the first embodiment of the present disclosure, and FIG. 4B is a perspective view schematically illustrating an arrangement of the foam pad of the LCD device according to the first embodiment of the present disclosure.

Referring to FIGS. 4A and 4B, the light guide plate 123, the guide panel 130 which surrounds the second to fourth side surfaces 123b to 123d of the light guide plate 123, and the foam pad 160 which is disposed above the guide panel 130 and the light guide plate 123 are illustrated in the drawings.

The light guide plate 123 may include the back surface 123f, the upper surface 123e opposite the back surface 123f, and the first to fourth side surfaces 123a to 123d which connect the upper surface 123e to the back surface 123f.

Here, the first side surface 123a and the third side surface 123c may be disposed in parallel, and the second side surface 123b and the fourth side surface 123d may be disposed in parallel.

The LEDs 129a (in FIG. 2), which are light sources, may be disposed on the first side surface 123a of the light guide plate 123.

Here, the edges of the second to fourth side surfaces 123b to 123d of the upper surface 123e of the light guide plate 123 are defined as a first region B1, and the remaining area of the upper surface 123e is defined as a second region B2.

The first adhesive surface 160a of the foam pad 160 is disposed to correspond to the first region B1 of the light guide plate 123 and the third surface 136c of the horizontal portion 136 of the guide panel 130.

Further, the optical sheets 127 (in FIG. 3) may be disposed in the second region B2 of the upper surface 123e of the light guide plate 123.

Here, the foam pad 160 and the optical sheets 127 (in FIG. 3) may have the same thickness, but the present disclosure is not limited thereto.

Since the optical sheets 127 (in FIG. 3) may be deformed or damaged by heat, the side surface 160c of the foam pad 160 may not have an adhesive force and may be spaced a predetermined distance from the optical sheets.

Here, the liquid crystal panel 110 (in FIG. 3) is mounted above the second adhesive surface 160b of the foam pad 160 so that the guide panel 130, the light guide plate 123, and the liquid crystal panel 110 (in FIG. 3) may be integrated through the foam pad 160.

Figure 4C:
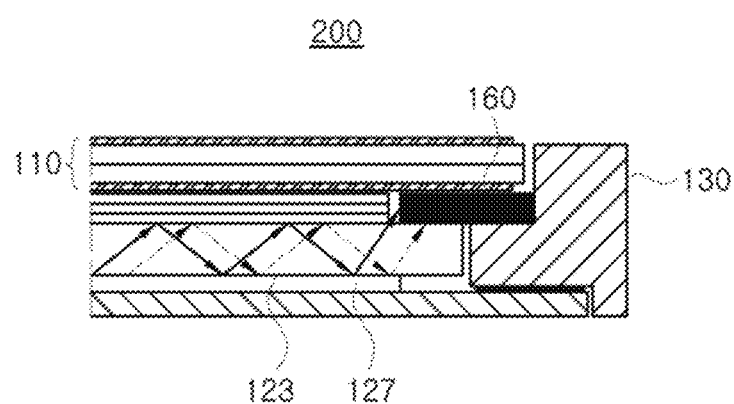
FIG. 4C is a cross-sectional view schematically illustrating a traveling direction of light of the LCD device according to the first embodiment of the present disclosure.
Figure 4D:
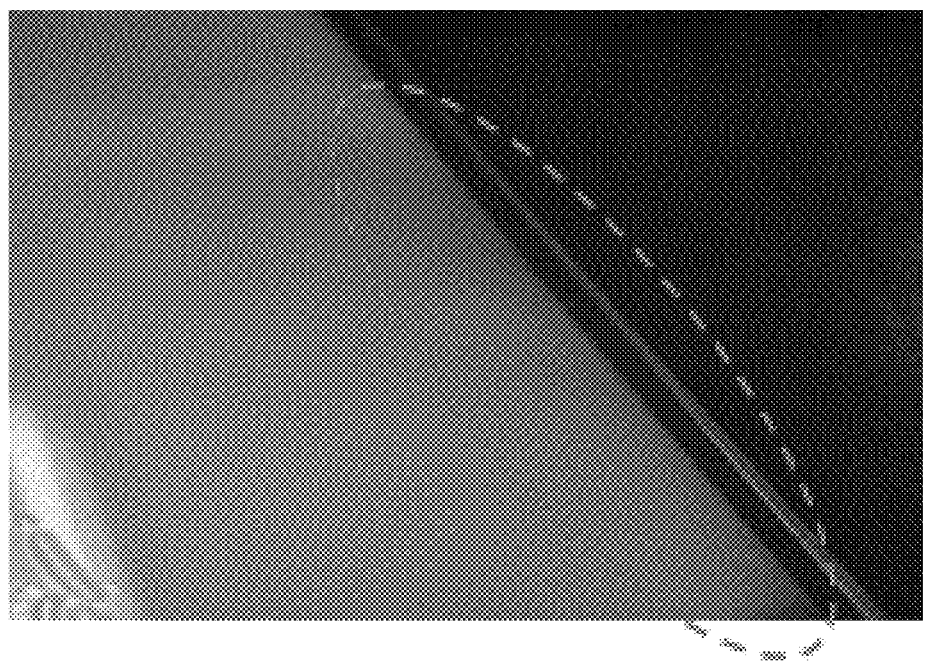
FIG. 4D is a photograph illustrating a dark portion which is generated in the LCD device according to the first embodiment of the present disclosure.

FIG. 4C is a cross-sectional view schematically illustrating a traveling direction of light of the LCD device according to the first embodiment of the present disclosure, and FIG. 4D is a photograph illustrating a dark portion which is generated in the LCD device according to the first embodiment of the present disclosure.

As illustrated in FIG. 4C, light input from a light-incident portion of the light guide plate 123 travels while being totally reflected inside the light guide plate 123.

Here, the foam pad 160 of the LCD device 100 according to the first embodiment may be formed with a light absorbing layer made of a black material. For example, black ink which absorbs light may be printed on the foam pad 160.

Since the foam pad 160 is formed with a light absorbing layer, the light which travels inside the light guide plate 123 may be absorbed by the foam pad 160, which is disposed on the edges of the upper surface 123e (in FIG. 4A) of the second to fourth side surfaces 123b to 123d (in FIG. 4A) of the light guide plate 123, so that leakage of the light between the liquid crystal panel 110 and the guide panel 130 may be prevented.

However, as illustrated in FIG. 4D, the light is absorbed by the foam pad 160 which is disposed on the edges of the upper surface 123e (in FIG. 4A) of the second to fourth side surfaces 123b to 123d (in FIG. 4A) of the light guide plate 123 so that a dark portion phenomenon, in which edges of the LCD device 100 on which the foam pad 160 is disposed are seen as being relatively darker than the other portions, occurs.

As described above, in the LCD device 100 according to the first embodiment of the present disclosure, the thickness W of the LCD device 100 may be minimized by directly attaching the liquid crystal panel 110 to the guide panel 130 and the light guide plate 123 through the foam pad 160, and thus the thin LCD device 100 may be effectively implemented.

Further, the light leakage between the liquid crystal panel 110 and the guide panel 130 may be prevented through the foam pad 160 formed with the light absorbing layer. However, a problem in that a dark portion is generated at the edges of the LCD device 100 is accompanied.

Second Embodiment

An LCD device according to a second embodiment of the present disclosure differs from the LCD device according to the first embodiment in that a foam pad is differently configured, and a description thereof will be described in more detail. Meanwhile, hereinafter, detailed descriptions of the same or similar components as those of the first embodiment may be omitted or may be brief for convenience of description.

Figure 5:
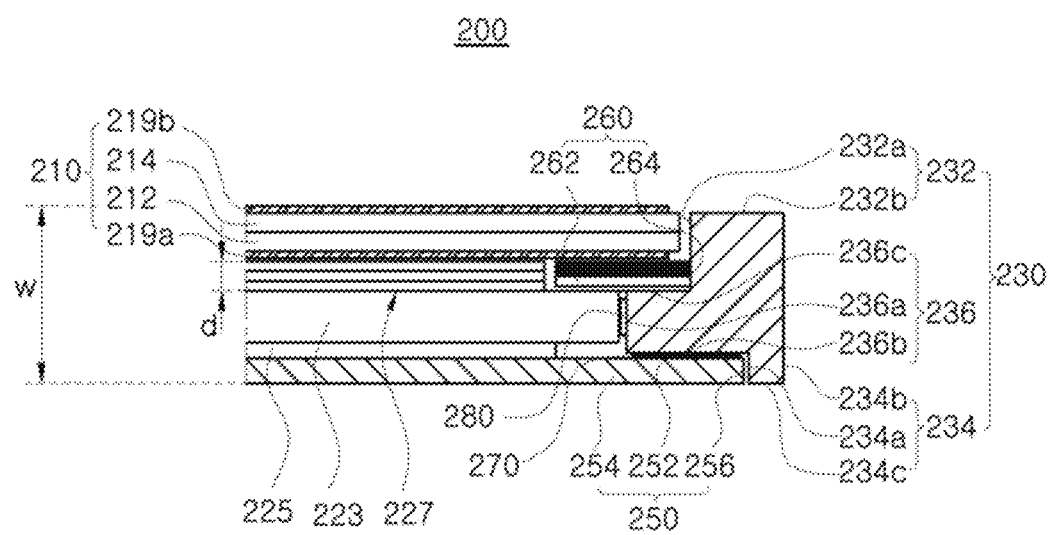
FIG. 5 is a cross-sectional view schematically illustrating a light-incident portion of a LCD device according to a second embodiment of the present disclosure.
Figure 6A:
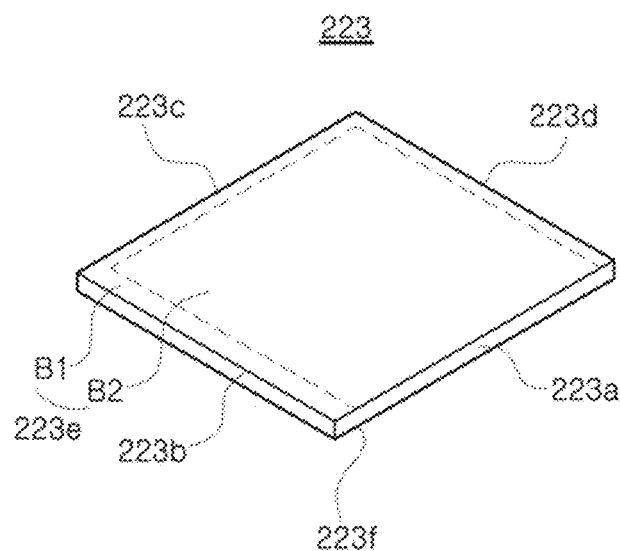
FIG. 6A is a perspective view schematically illustrating a light guide plate of the LCD device according to the second embodiment of the present disclosure.
Figure 6B:
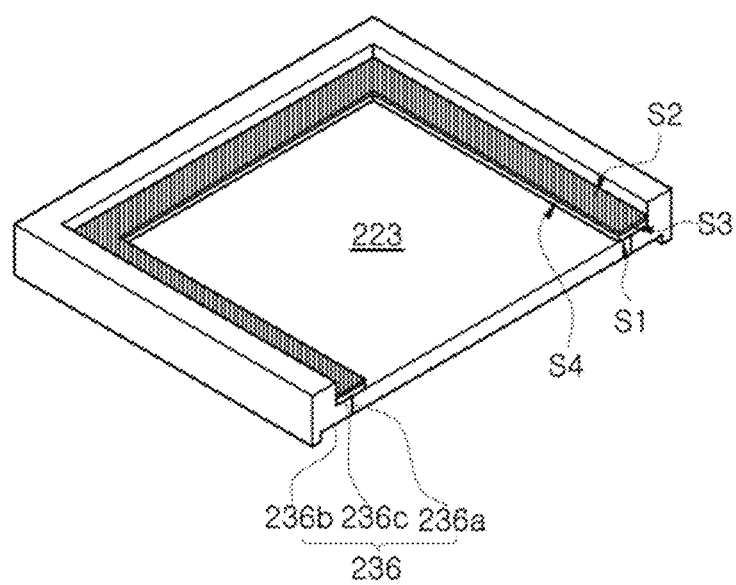
FIG. 6B is a perspective view schematically illustrating an arrangement of a foam pad of the LCD device according to the second embodiment of the present disclosure.

FIG. 5 is a cross-sectional view schematically illustrating a light-incident portion of the LCD device according to the second embodiment of the present disclosure, FIG. 6A is a perspective view schematically illustrating a light guide plate of the LCD device according to the second embodiment of the present disclosure, and FIG. 6B is a perspective view schematically illustrating an arrangement of a foam pad of the LCD device according to the second embodiment of the present disclosure.

Referring to FIGS. 5 to 6B, a light guide plate 223 of the LCD device 200 according to the second embodiment of the present disclosure may be formed of glass. For example, the light guide plate 223 may be made of soda lime glass, borosilicate glass, quartz glass, or the like, but the present disclosure is not limited thereto.

Accordingly, the light guide plate 223 of the present disclosure, which is made of glass having a rigidity higher than that of the conventional light guide plate 23 (in FIG. 1) made of an acrylic material, may be less deformed by external humidity and temperature changes and may be manufactured to be thin.

Further, the light guide plate 223 may include a back surface 223f which faces a first reflector 225, an upper surface 223e which faces a plurality of optical sheets 227, and a first side surface 223a, a second side surface 223b, a third side surface 223c, and a fourth side surface 223d, which connect the upper surface 223e to the back surface 223f.

Here, the first side surface 223a and the third side surface 223c may be disposed in parallel, and the second side surface 223b and the fourth side surface 223d may be disposed in parallel.

As described above, the LEDs 129a (in FIG. 2), which are light sources, may be disposed on the first side surface 223a of the light guide plate 223.

A second reflector 280 may be disposed on the third side surface 223c opposite the first side surface 223a.

Further, a cover bottom 250 of the LCD device 200 according to the second embodiment of the present disclosure may be made in a plate shape.

That is, the cover bottom 250 may have a shape of a plate on which the first reflector 225 is mounted.

Here, the cover bottom 250 may include a first horizontal surface 252 having a shape of a plate on which the first reflector 225 is mounted, a second horizontal surface 254 opposite the first horizontal surface 252, and a vertical surface 256 which connects the first horizontal surface 252 to the second horizontal surface 254.

Specifically, the cover bottom 250 may be made of glass. For example, the cover bottom 250 may be made of soda lime glass, borosilicate glass, quartz glass, or the like, but the present disclosure is not limited thereto.

Accordingly, the cover bottom 250 may be less deformed by external humidity and temperature changes and may be manufactured to be thin.

Meanwhile, a guide panel 230 of the LCD device 200 according to the second embodiment of the present disclosure may include a main body portion 232, a horizontal portion 236, and a vertical portion 234.

Here, the main body portion 232 may include an inner side surface 232a which is located above the horizontal portion 236 and the vertical portion 234 and faces a liquid crystal panel 210, and a plane 232b perpendicular to the inner side surface 232a.

The horizontal portion 236 may include a first surface 236a which faces the second to fourth side surfaces 223b to 223d of the light guide plate 223, a second surface 236b which faces the horizontal surface 252 of the cover bottom 250, and a third surface 236c opposite the second surface 236b. Here, the third surface 236c may be perpendicularly connected to the inner side surface 232a of the main body portion 232.

Further, the vertical portion 234 may include a fourth surface 234a which faces the vertical surface 256 of the cover bottom 250, a fifth surface 234b opposite the fourth surface 234a, and a sixth surface 234c which connects the fourth surface 234a to the fifth surface 234b. Here, the fifth surface 234b may be perpendicularly connected to the plane 232b of the main body portion 232.

Specifically, the horizontal portion 236 of the guide panel 230 may not be located above the light guide plate 223 and may be disposed on the same line which faces the second to fourth side surfaces 223b to 223d of the light guide plate 223.

Accordingly, an interval d between the liquid crystal panel 210 and the light guide plate 223 may be minimized.

Further, the guide panel 230 may be formed to surround the second to fourth side surfaces 223b to 223d of the light guide plate 223.

That is, the guide panel 230 may be formed in a U-shape which is open toward the first side surface 223a of the light guide plate 223 on which a light source is disposed.

Meanwhile, the cover bottom 250 may be disposed inside the fourth surface 234a of the vertical portion 234 of the guide panel 230.

That is, since the cover bottom 250 is disposed inside the fourth surface 234a of the guide panel 230, the thin LCD device 200 may be effectively implemented.

Further, a light shielding tape 270 may be disposed between the second surface 236b of the guide panel 230 and the first horizontal surface 252 of the cover bottom 250 corresponding to the second surface 236b. That is, the guide panel 230 and the cover bottom 250 may be fixed through the light shielding tape 270 having an adhesive force on both sides and, at the same time, light leakage between the guide panel 230 and the cover bottom 250 may be prevented.

Here, the second surface 236b may be formed to be larger than the third surface 236c of the guide panel 230 in consideration of the fixation of the guide panel 230 and the cover bottom 250 and the prevention of light leakage.

Meanwhile, in the LCD device 200 according to the second embodiment of the present disclosure, a foam pad 260 may be disposed between the liquid crystal panel 210 and the light guide plate 223.

That is, the foam pad 260 may be disposed to correspond to an edge of the upper surface 223e of each of the second to fourth side surfaces 223b to 223d of the light guide plate 223, and the liquid crystal panel 210 may be mounted thereabove.

Here, the foam pad 260 may include a first layer 262, which is a light reflecting layer and is in contact with the light guide plate 223, and a second layer 264, which is a light absorbing layer and is located between the first layer 262 and the liquid crystal panel 210.

The first layer 262 may be made of a white or silver material, and the second layer 264 may be made of a black material.

Further, the first layer 262 of the foam pad 260 may include an interface S3 in contact with the second layer 264 of the foam pad 260, and a first adhesive surface S1 opposite the interface S3.

The second layer 264 of the foam pad 260 may include a second adhesive surface S2 opposite the interface S3.

Here, the first adhesive surface S1 may come into contact with the edges of the upper surface 223e of the light guide plate 223 and the third surface 236c of the guide panel 230, and the second adhesive surface S2 may come into contact with the liquid crystal panel 210.

Further, the foam pad 260 may be formed in a U-shape, which is open toward the first side surface 223a of the light guide plate 223 on which a light source is disposed, to correspond to the guide panel 230.

Meanwhile, the LCD device 200 according to the second embodiment of the present disclosure may be configured not to include the case top 40 (in FIG. 1) which surrounds a front edge of the liquid crystal panel 210. As described above, when the liquid crystal panel 210 is configured not to include the case top 40 (in FIG. 1) and to be directly exposed to the outside, the LCD device 200 has an advantage in that it may have a beautiful appearance and may be recognized by the user as having a larger area.

Further, a thickness W of the LCD device 200 may be minimized by directly attaching the liquid crystal panel 210 to the guide panel 230 and the light guide plate 223 through the foam pad 260.

The cover bottom 250, which is made of glass, covers a lower portion of the backlight unit 120 (in FIG. 2).

The liquid crystal panel 210 and the backlight unit 120 (in FIG. 2) may be modularized using the guide panel 230 and the cover bottom 250 which are configured as described above.

Specifically, as illustrated in FIGS. 6A and 6B, the light guide plate 223, the guide panel 230 which surrounds the second to fourth side surfaces 223b to 223d of the light guide plate 223, and the foam pad 260, which is disposed above the guide panel 230 and the light guide plate 223, are illustrated as being included in the LCD device 200 according to the second embodiment of the present disclosure.

Here, the edges of the upper surface 223e of the light guide plate 223 are defined as a first region B1, and the remaining area of the upper surface 223e is defined as a second region B2.

The first adhesive surface S1 of the foam pad 260 is disposed to correspond to the first region B1 of the light guide plate 223 and the third surface 236c of the horizontal portion 236 of the guide panel 230.

Further, the optical sheet 227 may be disposed in the second region B2 of the upper surface 223e of the light guide plate 223.

Here, the foam pad 260 and the optical sheet 227 may have the same thickness, but the present disclosure is not limited thereto.

Since the optical sheet 227 may be deformed or damaged by heat, a side surface S4 of the foam pad 260 may not have an adhesive force and may be spaced a predetermined distance from the optical sheet 227.

Here, the liquid crystal panel 210 is mounted above the second adhesive surface S2 of the foam pad 260 so that the guide panel 230, the light guide plate 223, and the liquid crystal panel 210 may be integrated through the foam pad 260.

Meanwhile, the foam pad 260 including the first layer 262, which is a light reflecting layer, and the second layer 264, which is a light absorbing layer, may be disposed only above the third side surface 223c of the light guide plate 223, which is a light-incident portion. For example, when a dark portion is generated only at an edge of the light-incident portion in the LCD device 200, the foam pad 260 including the first layer 262, which is a light reflecting layer, and the second layer 264, which is a light absorbing layer, may be disposed above the third side surface 223c of the light guide plate 223, and the foam pad 260 including only the second layer 264, which is a light absorbing layer, may be disposed above the second side surface 223b and the fourth side surface 223d of the light guide plate 223.

Therefore, in the LCD device 200 according to the second embodiment of the present disclosure, the foam pad 260 including the first layer 262, which is a light reflecting layer, and the second layer 264, which is a light absorbing layer, may be disposed at an edge at which a dark portion is generated so that the dark portion may be selectively improved.

Further, the first layer 262, which is a light reflecting layer, is preferably formed to be thinner than the second layer 264, which is a light absorbing layer, but the present disclosure is not limited thereto, and a thickness of each of the first layer 262 and the second layer 264 may be variously changed in consideration of a reflection region of light and an absorption region of light.

Meanwhile, reflectance of the first layer 262, which is a light reflecting layer, is preferably 95 or more, but the present disclosure is not limited thereto.

Figure 7:
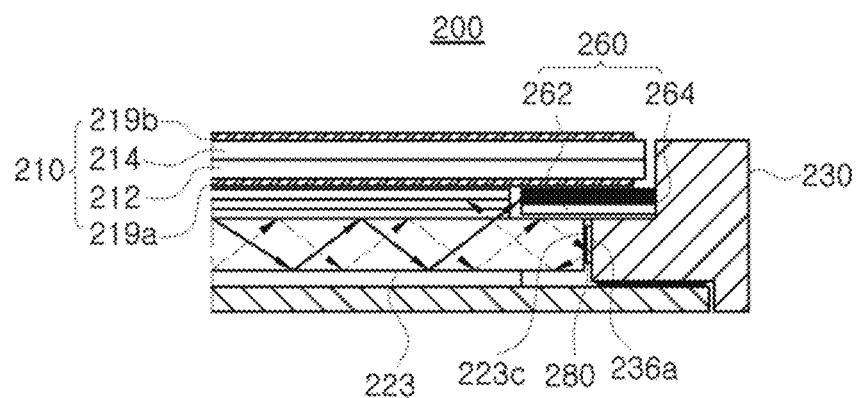
FIG. 7 is a cross-sectional view schematically illustrating a traveling direction of light of the LCD device according to the second embodiment of the present disclosure.
Figure 8:
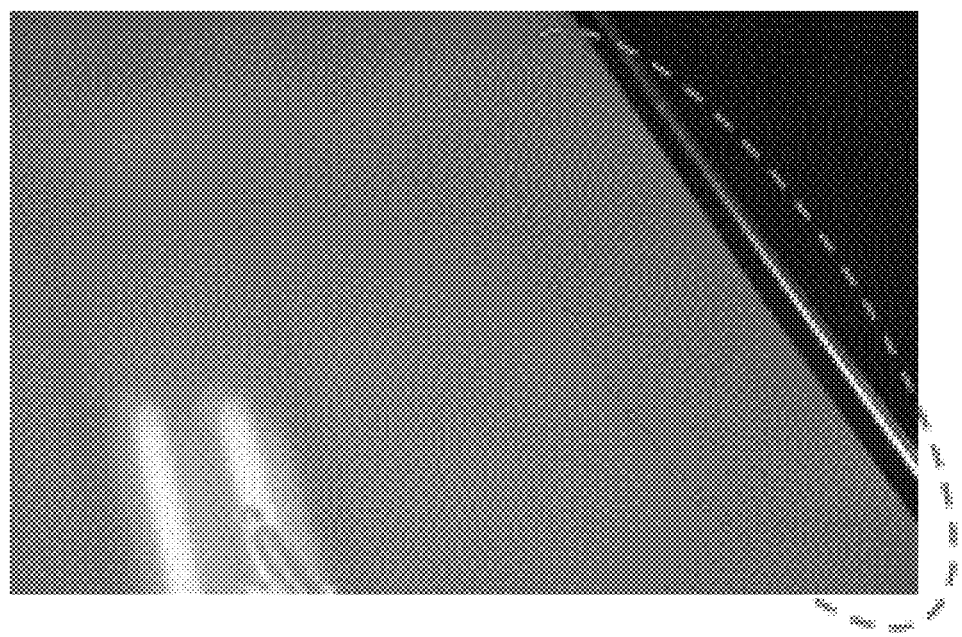
FIG. 8 is a photograph illustrating a dark portion which is improved in the LCD device according to the second embodiment of the present disclosure.

FIG. 7 is a cross-sectional view schematically illustrating a traveling direction of light of the LCD device according to the second embodiment of the present disclosure, and FIG. 8 is a photograph illustrating a dark portion which is improved in the LCD device according to the second embodiment of the present disclosure.

As illustrated in FIG. 7, light input from a light-incident portion of the light guide plate 223 travels while being totally reflected inside the light guide plate 223.

Here, in the foam pad 260 of the LCD device 200 according to the second embodiment, the first layer 262 may be formed with a light reflecting layer made of a white or silver material, and the second layer 264 may be formed with a light absorbing layer made of a black material.

For example, any one of white ink, silver-based ink which is bright similar to white, pastes, paints, and the like, which are a reflective material, may be printed on the first layer 262, and black ink which absorbs light may be printed on the second layer 264.

Therefore, leakage of light between the liquid crystal panel 210 and the guide panel 230 may be prevented through the second layer 264 of the foam pad 260, which is a light absorbing layer.

Specifically, as the first layer 262, which is a light reflecting layer, is disposed under the second layer 264, which is a light absorbing layer, the light which travels inside the light guide plate 223 is not absorbed by the foam pad 260 and is reflected by the first layer 262, which is a light reflecting layer, so that the occurrence of a dark portion phenomenon at the edges of the LCD device 200 may be prevented.

In addition, as the second reflector 280 is disposed between the third side surface 223c (in FIG. 6A) of the light guide plate 223 and the first surface 236a of the guide panel 230, light reaching the light-incident portion may be made to be incident on the light guide plate 223 again through the second reflector 280 so that dark portions generated at the edges of the LCD device 200 may be more effectively improved.

As described above, in the LCD device 200 according to the second embodiment of the present disclosure, the light leaking between the liquid crystal panel 210 and the guide panel 230 may be absorbed by the second layer 264 through the foam pad 260 including the first layer 262, which is a light reflecting layer, and the second layer 264, which is a light absorbing layer, and the other light may be reflected by the first layer 262 to be output to a dark portion.

Therefore, as illustrated in FIG. 8, it can be seen that the light leakage between the liquid crystal panel 210 and the guide panel 130 in the LCD device 200 and the dark portion generated at the edges of the LCD device 200 are improved.

As described above, in the LCD device 200 according to the second embodiment of the present disclosure, the thickness W of the LCD device 200 may be minimized by directly attaching the liquid crystal panel 210 to the guide panel 230 and the light guide plate 223 through the foam pad 260, and thus a thin LCD device may be effectively implemented.

Further, the light leakage between the liquid crystal panel 210 and the guide panel 230 may be prevented through the foam pad 260 including the first layer 262, which is a light reflecting layer, and the second layer 264, which is a light absorbing layer, and, at the same time, the dark portion phenomenon generated at the edges of the LCD device 200 may be effectively prevented.

In the present disclosure, a light guide plate is formed of glass, and a liquid crystal panel and the light guide plate are attached using a foam pad. Accordingly, the thickness of the LCD device can be minimized.

In addition, the foam pad includes a light reflecting layer and a light absorbing layer, and thus light leakage can be prevented by the light absorbing layer and a dark portion phenomenon can be effectively improved by the light reflecting layer.

The above-described embodiments of the present disclosure are examples of the present disclosure and can be freely modified within the spirit of the present disclosure. Therefore, the present disclosure encompasses all modifications derived from the scope and equivalents of the appended claims.

What is claimed is:

1. A liquid crystal display (LCD) device comprising:
a liquid crystal panel;
a light guide plate made of glass, disposed under the liquid crystal panel, and including a first side surface, a second side surface, a third side surface, and a fourth side surface;
a light source disposed on the first side surface of the light guide plate;
an optical sheet disposed between the liquid crystal panel and the light guide plate; and
a foam pad corresponding to upper edges of the second to fourth side surfaces of the light guide plate and disposed between the liquid crystal panel and the light guide plate,
wherein the foam pad disposed on the third side surface opposite the first side surface includes a first layer, which is a light reflecting layer and is in contact with the light guide plate, and a second layer, which is a light absorbing layer and is disposed between the first layer and the liquid crystal panel.

2. The LCD device of claim 1, wherein the foam pad disposed on each of the second side surface and the fourth side surface, which face each other, of the light guide plate includes a third layer, which is a light reflecting layer and is in contact with the light guide plate, and a fourth layer, which is a light absorbing layer and is disposed between the third layer and the liquid crystal panel.

3. The LCD device of claim 2, wherein:
each of the first layer and the third layer is made of a white or silver material; and
each of the second layer and the fourth layer is made of a black material.

4. The LCD device of claim 3, further comprising:
a guide panel configured to surround the second to fourth side surfaces of the light guide plate; and
a cover bottom disposed under the light guide plate and including a horizontal surface and a vertical surface,
wherein:
the guide panel includes a horizontal portion and a vertical portion;
the horizontal portion faces the second to fourth side surfaces of the light guide plate; and
the vertical portion faces the vertical surface of the cover bottom.

5. The LCD device of claim 4, wherein the first layer of the foam pad is attached to the upper edge of the light guide plate and an upper surface of the horizontal portion of the guide panel, and the second layer of the foam pad is attached to the liquid crystal panel.

6. The LCD device of claim 5, wherein the foam pad and the guide panel have a shape which is open toward the first side surface of the light guide plate.

7. The LCD device of claim 4, further comprising a first reflector disposed between the cover bottom and the light guide plate.

8. The LCD device of claim 7, further comprising a second reflector disposed on the horizontal portion of the guide panel to correspond to the third side surface of the light guide plate.

9. The LCD device of claim 4, wherein the cover bottom is made of glass, and the LCD device further comprises a light shielding tape disposed between a lower surface of the horizontal portion and the cover bottom.

* * * * *